(12) United States Patent
Cheng

(10) Patent No.: US 9,493,094 B2
(45) Date of Patent: Nov. 15, 2016

(54) SEAT TILT ANGLE CONTROL DEVICE

(71) Applicant: MERITS HEALTH PRODUCTS CO., LTD., Taichung (TW)

(72) Inventor: Ming-Chuan Cheng, Taichung (TW)

(73) Assignee: MERITS HEALTH PRODUCTS, CO., LTD., Taichung (TW)

( * ) Notice: Subject to any disclaimer, the term of this patent is extended or adjusted under 35 U.S.C. 154(b) by 0 days.

(21) Appl. No.: 14/806,367

(22) Filed: Jul. 22, 2015

(65) Prior Publication Data

US 2016/0023574 A1 Jan. 28, 2016

(30) Foreign Application Priority Data

Jul. 24, 2014 (TW) ............... 103125351 A

(51) Int. Cl.
*G05G 1/10* (2006.01)
*B60N 2/10* (2006.01)
*B60N 2/44* (2006.01)

(52) U.S. Cl.
CPC ............. *B60N 2/10* (2013.01); *B60N 2/442* (2013.01); *B60N 2002/4425* (2013.01)

(58) Field of Classification Search
CPC B60N 2/10; B60N 2/442; B60N 2002/4425; A47C 1/03222; A47C 7/00
See application file for complete search history.

(56) References Cited

U.S. PATENT DOCUMENTS

| | | | | |
|---|---|---|---|---|
| 7,302,789 B2* | 12/2007 | Eavenson, Sr. | ........ | A01D 34/76 180/6.48 |
| 2007/0080003 A1* | 4/2007 | Koerlin | ........ | A61G 5/045 180/65.1 |
| 2007/0227286 A1* | 10/2007 | Kandasamy | ........ | B25C 5/0242 74/469 |
| 2008/0184835 A1* | 8/2008 | Breidenbach | ........ | B62D 35/004 74/469 |
| 2008/0314181 A1* | 12/2008 | Schena | ........ | A61B 34/70 74/469 |
| 2009/0178381 A1* | 7/2009 | Gilles | ........ | A01D 34/64 56/15.2 |
| 2009/0230730 A1* | 9/2009 | Ohtsubo | ........ | B60N 2/0232 296/193.07 |
| 2011/0175426 A1* | 7/2011 | Lawson | ........ | A47C 1/0355 297/85 M |
| 2011/0193373 A1* | 8/2011 | Lawson | ........ | A47C 1/035 297/71 |
| 2012/0261963 A1* | 10/2012 | Heyer | ........ | B60N 2/0232 297/313 |
| 2013/0009435 A1* | 1/2013 | Westerink | ........ | B64D 11/06 297/313 |
| 2013/0175847 A1* | 7/2013 | Lawson | ........ | A61G 5/14 297/85 M |
| 2014/0070585 A1* | 3/2014 | LaPointe | ........ | A61G 5/14 297/316 |
| 2014/0368011 A1* | 12/2014 | LaPointe | ........ | A61G 5/14 297/316 |

* cited by examiner

*Primary Examiner* — William Kelleher
*Assistant Examiner* — Zakaria Elahmadi
(74) *Attorney, Agent, or Firm* — Muncy, Geissler, Olds & Lowe, P.C.

(57) ABSTRACT

A seat tilt angle control device includes a tilt unit including a drive mechanism for tilting the tilt unit within a predetermined range and a mounting assembly, a control unit angularly adjustably mounted in the mounting assembly of the tilt unit and including a switch electrically coupled to the drive mechanism and movable between a first angle range where the switch controls the drive mechanism to be movable and a second angle range where the switch controls the drive mechanism to be immovable.

9 Claims, 4 Drawing Sheets

SEAT TILT ANGLE CONTROL DEVICE

BACKGROUND OF THE INVENTION

1. Field of the Invention

The present invention relates to vehicle technology, and more particularly to a seat tilt angle control device for controlling the tilt angle of the vehicle seat.

2. Description of the Related Art

Most conventional vehicle seat tilt angle control devices do not allow adjustment of the tilt angle. Some conventional vehicle seat tilt angle control devices that allow adjustment of the tilt angle have the drawbacks of being difficult to control the adjustment angle, and not allowing the user to know the adjustment status.

Further, it is necessary to detach many component parts before adjusting a conventional vehicle seat tilt angle control device, causing inconvenience to the user. Further, different models of vehicles have different weight configurations, and must be equipped with different vehicle seat tilt angle control devices of which the component parts cannot be shared, causing problems in production management costs and other aspects.

Therefore, conventional vehicle seat tilt angle control devices are still not satisfactory in function. Improvement in this regard is necessary.

SUMMARY OF THE INVENTION

The present invention has been accomplished under the circumstances in view. The technical concept of the present invention is to provide a seat tilt angle control device, which can be controlled to accurately adjust the tilt angle adjustment range without detaching many component parts, assuring a high level of convenience and safety.

To achieve this and other objects of the present invention, a seat tilt angle control device of the invention comprises a tilt unit comprising a drive mechanism for tilting the tilt unit within a predetermined angle and a mounting assembly, a control unit angularly adjustably mounted in the mounting assembly and comprising a switch electrically coupled to the drive mechanism and movable between a first angle range where the switch controls the drive mechanism to be movable and second angle range where the switch controls the drive mechanism not to be moved.

By means of the control unit, the seat tilt angle control device can be conveniently adjustably mounted in the tilt unit, facilitating adjustment of the tilt angle adjustment range.

Other advantages and features of the present invention will be fully understood by reference to the following specification in conjunction with the accompanying drawings, in which like reference signs denote like components of structure.

DETAILED DESCRIPTION OF THE INVENTION

Prior to reading the specification, it is to be noted that the directional adjectives of inner, outer, upper and lower through the whole specification are based on the direction of the annexed drawings.

Figure 1:
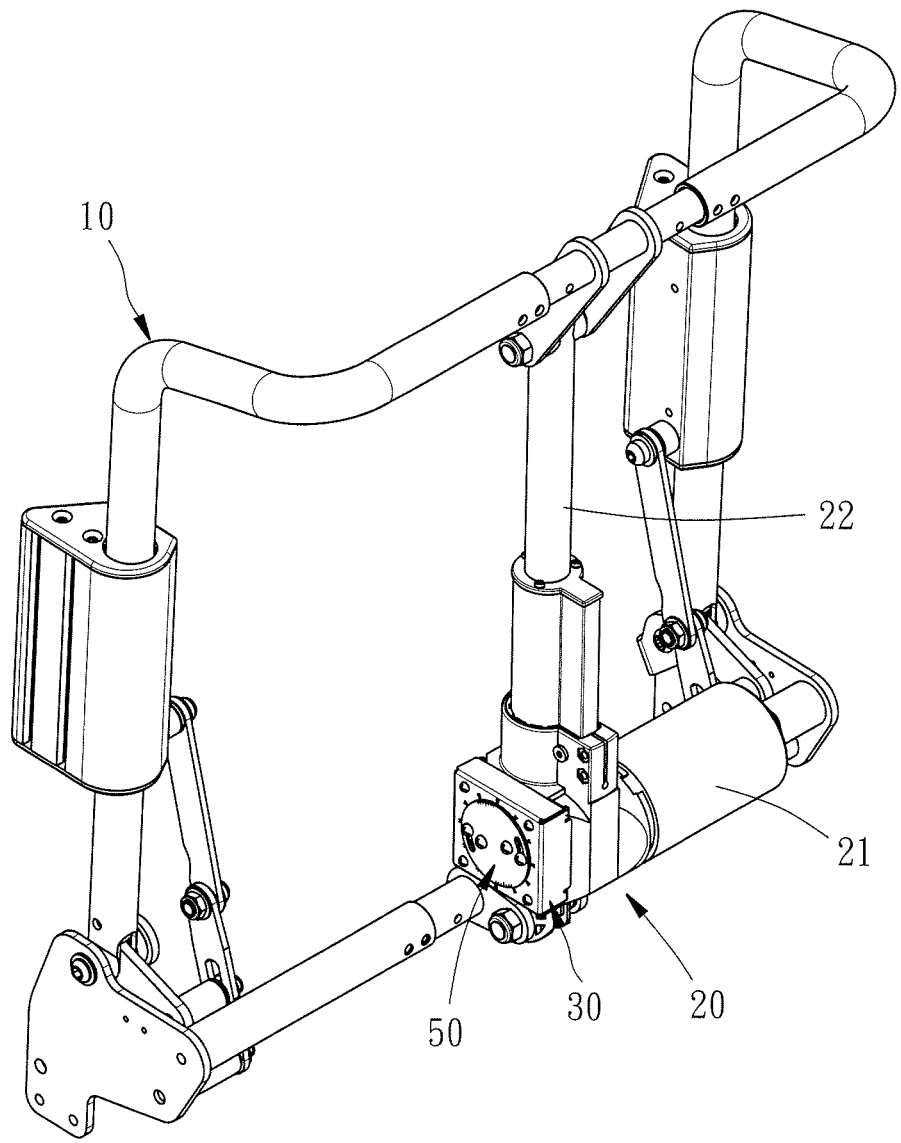
FIG. 1 is an oblique top elevational view of a seat tilt angle control device in accordance with the present invention.
Figure 2:
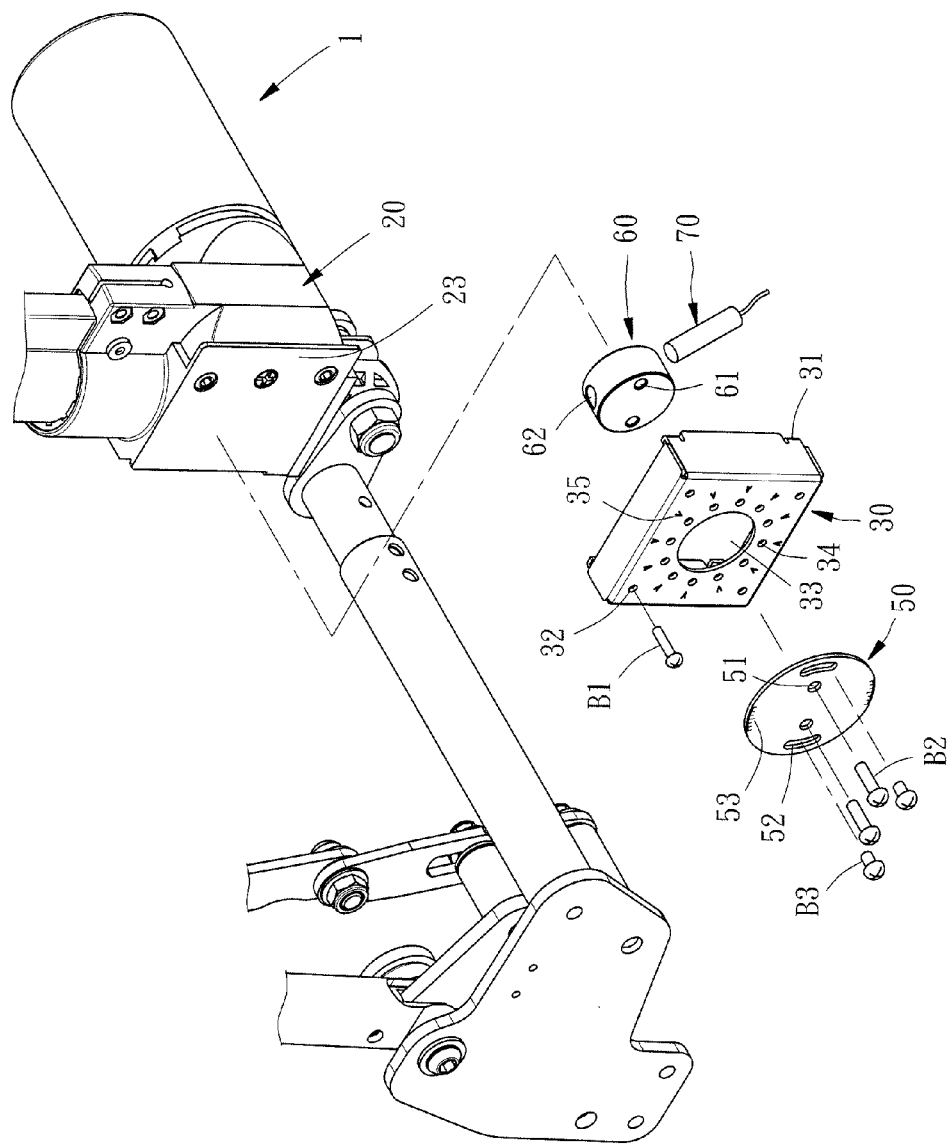
FIG. 2 is an exploded view of the seat tilt angle control device in accordance with the present invention.
Figure 3:
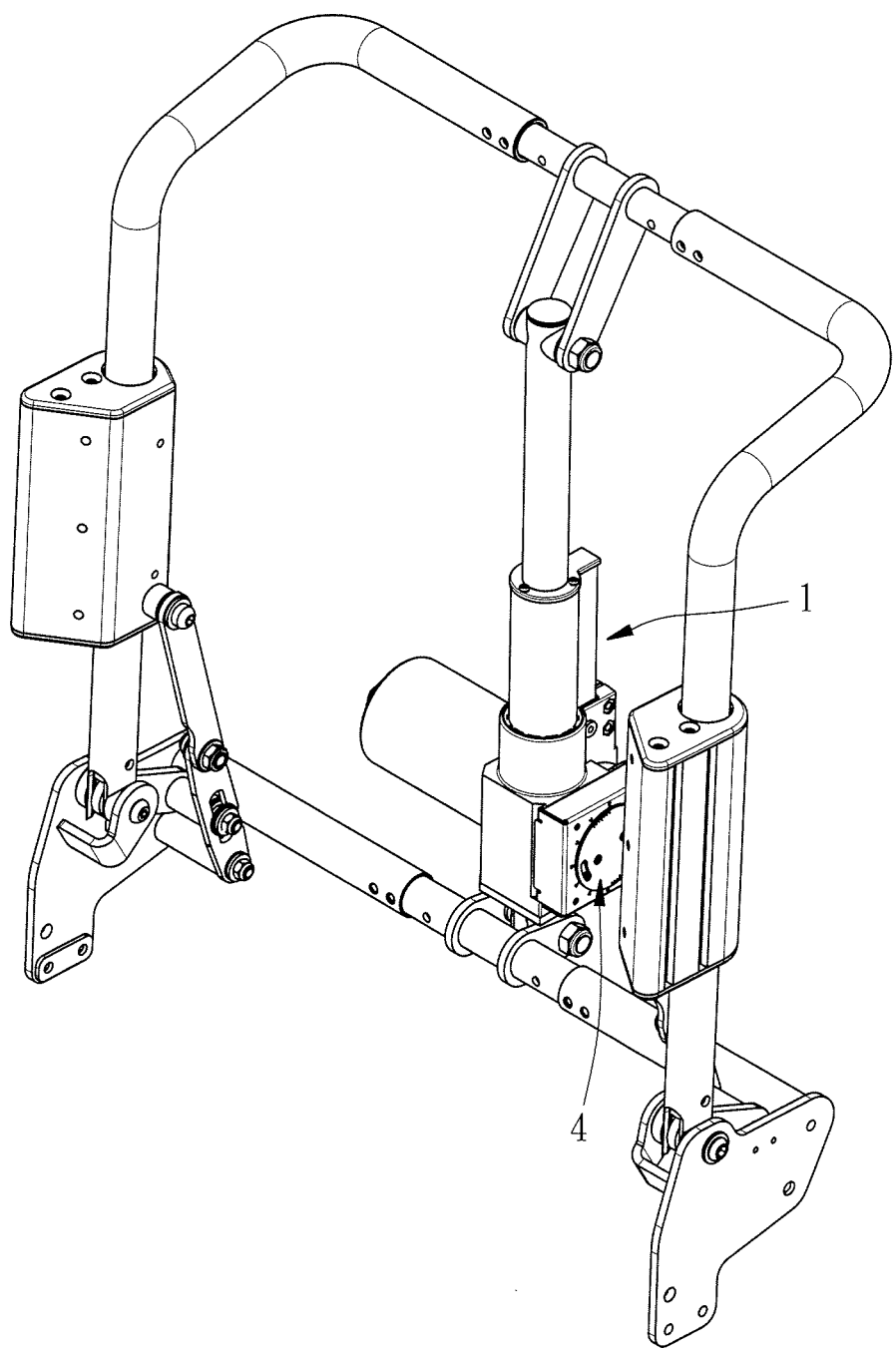
FIG. 3 corresponds to FIG. 1 when viewed from another angle.

Referring to FIGS. 1-3, a seat tilt angle control device in accordance with the present invention is shown. The seat tilt angle control device comprises:

a tilt unit 1 mounted in a seat back of a vehicle seat, comprising a tilt support frame set 10;

a drive mechanism 20 adapted for tilting the tilt unit 1 within a predetermined angle, comprising a motor 21, a linking member 22 and a connection member 23;

a mounting assembly 30 mounted in the drive mechanism 20, comprising a connection member 31 capped on the connection member 23 of the drive mechanism 20, a plurality of mounting through holes 32 cut through the connection member 31, a plurality of screw bolts B1 mounted in the mounting through holes 32 to affix the connection member 31 to the connection member 23 of the drive mechanism 20, an opening 33 cut through the connection member 31, a plurality of adjustment holes 34 cut through the connection member 31 and equiangularly spaced around the opening 33, and an indicator 35;

a control unit 4 angularly adjustably mounted in the tilt unit 1, comprising an adjustment member 50 for adjusting the mounting assembly 30 at the tilt unit 1;

a switch mount 60 connected to the adjustment member 50; and a switch 70 mounted in the switch mount 60 and electrically coupled to the drive mechanism 20.

Further, the adjustment member 50 comprises two connecting hole 51; the switch mount 60 comprises two connecting hole 61 respectively connected to the connecting hole 51 of the adjustment member 50 by respective screw bolts B2.

Further, the control unit 4 comprises at least one, for example, two adjustment holes 52. These adjustment holes 52 are elongated and smoothly curved slots. Further, screw bolt B3 are respectively inserted through the adjustment holes of the control unit 4 and adjustably and selectively fastened to the adjustment hole 34 of the mounting assembly 30 to adjustably affix the adjustment member 50 to the of the mounting assembly 30 at the tilt unit 1. In other words, the adjustment holes 52 of the control unit 4 can be fixedly fastened to the adjustment hole 34 of the mounting assembly 30.

The control unit 4 further comprises an index 53 corresponding to the indicator 35 of the tilt unit 1.

Further, the switch mount 60 is inserted into the opening 33 of the mounting assembly 30, comprising a switch mounting hole 62.

The switch 70 is mounted in the switch mounting hole 62 of the switch mount 60. In this embodiment, the switch 70 is a mercury switch. However, mercury switch is not a limitation.

When the switch 70 is in a first angle range, it drives on the drive mechanism 20. When the switch 70 is in a second angle range, it stops the drive mechanism 20 from movement. In this embodiment, the first angle range and the second angle range are divided by the horizontal line.

The main features and effects of the present invention are outlined hereinafter:

As illustrated in FIG. 3, when in the first angle range position, the switch 70 is off and cannot control the drive mechanism 20 from not being moved, and therefore, the tilt unit 1 can be freely tilted.

Figure 4:
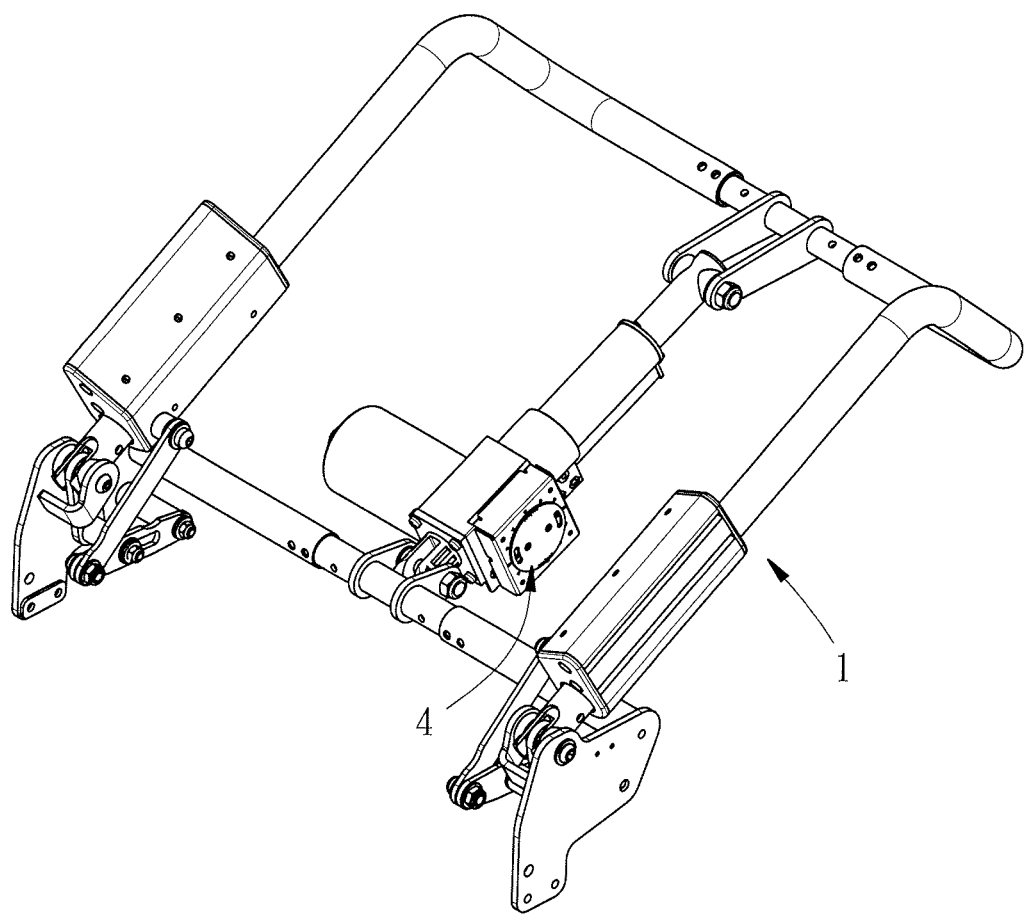
FIG. 4 corresponds to FIG. 3, illustrating the tilt angle adjusted.

As illustrated in FIG. 4, when the tilt unit 1 is maximumly tilted, the switch 70 is shifted into the second angle range and electrically conducted to control the drive mechanism 20 from being moved, thus, the tilt unit 1 is stopped from tilting to prevent rollovers.

Thus, when adjusting the tilt angle adjustment range, loosen the screw bolt B3 from the adjustment hole 52 for allowing micro adjustment of the angular position of the adjustment member 50. Alternatively, the screw bolt B3 can be respectively affixed to respective other adjustment holes 34 of the mounting assembly 30 to largely change the angular position of the control unit 4.

Thus, the mounting assembly 30 provides multiple adjustment holes 34 for the mounting of the adjustment holes 52 of the adjustment member 50 in a selective manner. Further, the adjustment holes 52 are elongated and smoothly arched slots for micro adjustment.

Further, the indicator 35 of the tilt unit 1 mates with the index 53 of the control unit 4 for visually checking the angle being adjusted.

Because the seat tilt angle control device of the invention allows free adjustment of the tilt angle, it is practical for use in any of a variety of different models and types of motor vehicles. Accordingly, the present invention has the advantage of saving component parts.

Except the aforesaid embodiment, the seat tilt angle control device of the invention can be variously embodied.

For example, except the arrangement of mounting the control unit 4 in the drive mechanism 20, control unit 4 can also be installed in the tilt support frame set 10.

Or, the switch 70 can be roll ball switch instead of the aforesaid mercury switch.

Further, in addition to the application of being used in a seat back, the seat tilt angle control device can also be used in a seat cushion or any other different part of the vehicle seat.

One or a combination of multiple of the aforesaid embodiments of the present invention can achieve the objects of the present invention.

In conclusion, the seat tilt angle control device of the present invention can be controlled to accurately adjust the tilt angle adjustment range without detaching many component parts, assuring a high level of convenience and safety, and effectively achieving the objects of the present invention.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A seat tilt angle control device, comprising
a tilt unit comprising a drive mechanism for tilting said tilt unit, and a mounting assembly;
a control unit angularly adjustably mounted in said mounting assembly of said tilt unit, said control unit comprising a switch electrically coupled to said drive mechanism, said switch being movable between a first angle range where said switch controls said drive mechanism to be movable and a second angle range where said switch controls said drive mechanism to be immovable,
wherein said mounting assembly comprises a plurality of equiangularly spaced adjustment holes; said control unit comprises at least one adjustment hole selectively connectable to the adjustment holes of said mounting assembly.

2. The seat tilt angle control device as claimed in claim 1, wherein said control unit comprises an adjustment member angularly adjustably fastened to said tilt unit, and a switch mount connected to said adjustment member and adapted for holding said switch.

3. The seat tilt angle control device as claimed in claim 2, wherein said tilt unit comprises an indicator; said control unit comprises an index mating with the indicator of said tilt unit.

4. The seat tilt angle control device as claimed in claim 3, wherein said mounting assembly is installed in said drive mechanism.

5. The seat tilt angle control device as claimed in claim 2, wherein said mounting assembly is installed in said drive mechanism.

6. The seat tilt angle control device as claimed in claim 1, wherein said mounting assembly is installed in said drive mechanism.

7. The seat tilt angle control device as claimed in claim 1, wherein said tilt unit comprises an indicator; said control unit comprises an index mating with said indicator of said tilt unit.

8. The seat tilt angle control device as claimed in claim 7, wherein said mounting assembly is installed in said drive mechanism.

9. The seat tilt angle control device as claimed in claim 1, wherein said control unit comprises at least one adjustment hole angularly adjustably fastened to said mounting assembly of said tilt unit.

* * * * *